US006975346B2

(12) United States Patent
Kumhyr

(10) Patent No.: US 6,975,346 B2
(45) Date of Patent: Dec. 13, 2005

(54) METHOD FOR SUSPECT IDENTIFICATION USING SCANNING OF SURVEILLANCE MEDIA

(75) Inventor: David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 10/185,685

(22) Filed: Jun. 27, 2002

(65) Prior Publication Data
US 2004/0001142 A1    Jan. 1, 2004

(51) Int. Cl.[7] ............................................... H04N 7/18
(52) U.S. Cl. ....................... 348/143; 382/190; 382/181
(58) Field of Search ................. 348/143–177; 713/202, 170, 186; 707/104.1, 102, 101; 340/574, 573.1, 5.53; 382/190, 191; 704/275; 705/1, 2, 5; H04N 7/18

(56) References Cited

U.S. PATENT DOCUMENTS

| | | | |
|---|---|---|---|
| 5,457,747 A * | 10/1995 | Drexler et al. .............. | 713/186 |
| 6,332,193 B1 * | 12/2001 | Glass et al. ................. | 713/170 |
| 6,504,470 B2 * | 1/2003 | Puchek et al. ............. | 340/5.53 |
| 6,559,769 B2 * | 5/2003 | Anthony et al. ............ | 340/574 |
| 6,611,206 B2 * | 8/2003 | Eshelman et al. ........ | 340/573.1 |
| 6,725,383 B2 * | 4/2004 | Kyle .......................... | 713/202 |
| 2003/0044050 A1 * | 3/2003 | Clark et al. ................. | 382/115 |
| 2003/0063004 A1 * | 4/2003 | Anthony et al. ............ | 340/574 |
| 2004/0093349 A1 * | 5/2004 | Buinevicius et al. ..... | 707/104.1 |

* cited by examiner

Primary Examiner—Tung Vo
(74) Attorney, Agent, or Firm—Duke W. Yee; Jeffrey S. LaBaw; Christopher P. O'Hagan

(57) ABSTRACT

A method, program and apparatus for criminal suspect identification are provided. Monitoring and video recording are used to collect information at a given location. In response to specific events, such as a criminal act, the system uses real time analysis of the video to identify physical characteristics of any persons shown. The system compiles an identification profile for each person, including distinguishing physical characteristics extracted from the video information, and then transmits the profiles to law enforcement authorities. The suspect-identification system also scans previously stored video information of the location, comparing profiles from the crime scene with images in the stored video. If any matches are found, the system updates the identification profiles with additional information from matched images and transmits the updated identification profile to the authorities.

1 Claim, 3 Drawing Sheets

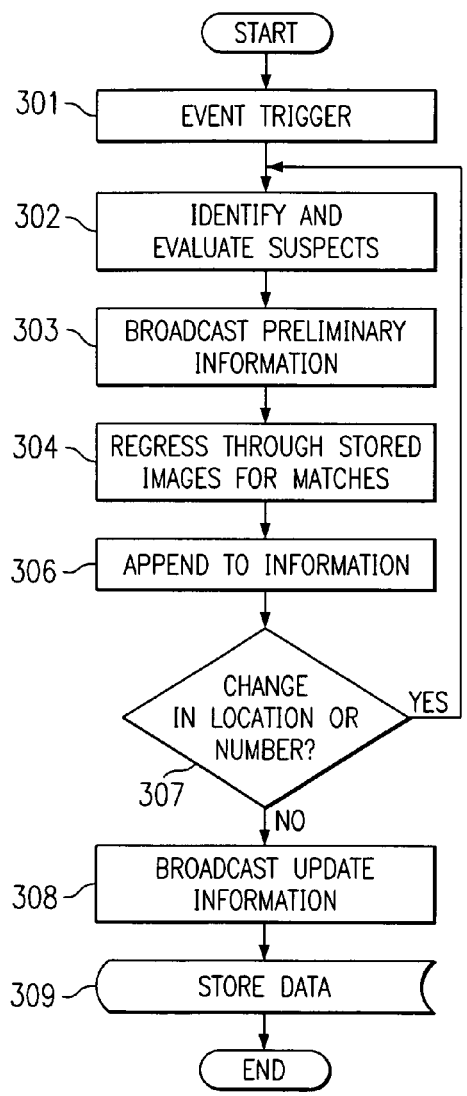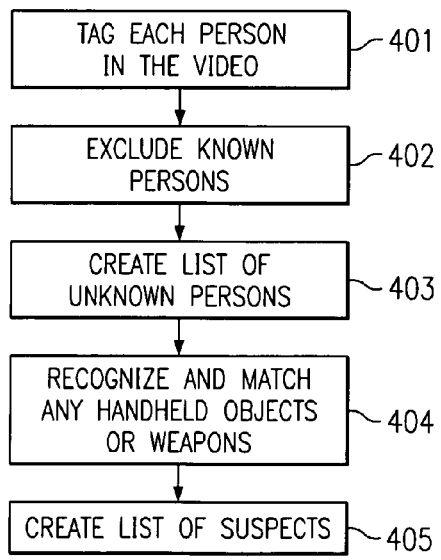

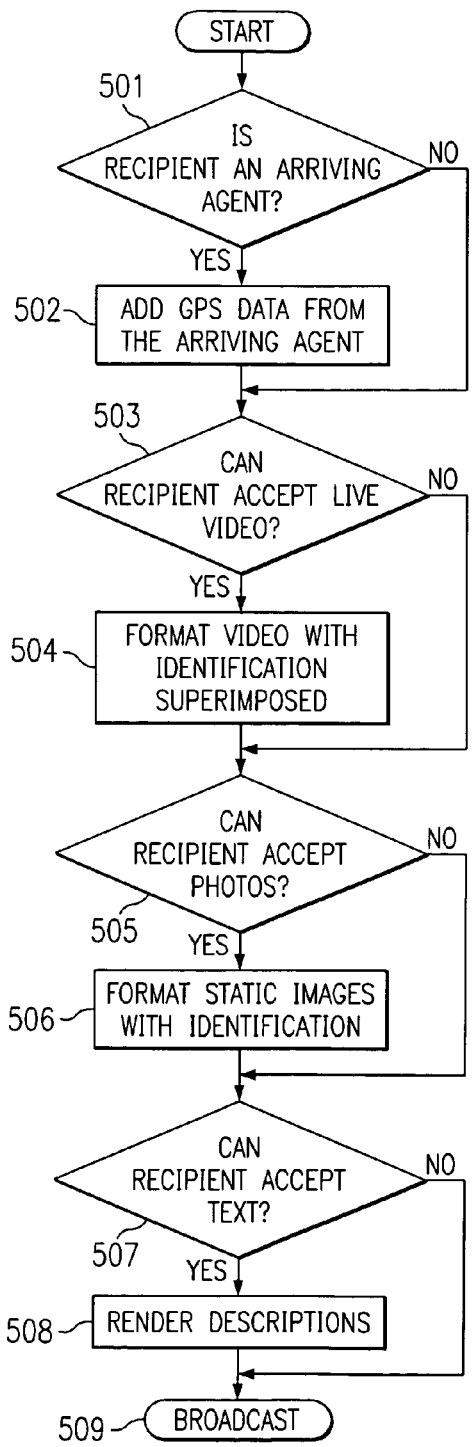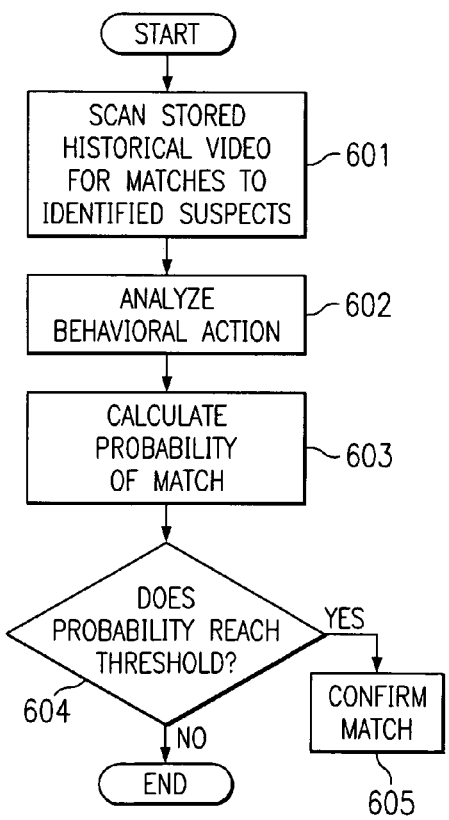

METHOD FOR SUSPECT IDENTIFICATION USING SCANNING OF SURVEILLANCE MEDIA

BACKGROUND OF THE INVENTION

1. Technical Field

The present invention relates generally to surveillance technology, and more specifically to methods for identifying subjects based on analysis of surveillance data.

2. Description of Related Art

Video surveillance has been a common security technology for many years. Video is not only helpful in monitoring current activity in sensitive locations but has also been successfully employed in helping to solve crimes by helping law enforcement authorities identify suspects.

When attempting to identify criminal suspects, law enforcement authorities usually do not have access to video surveillance records until a significant amount of time has elapsed after the crime. Therefore, video records are use primarily for solving crimes after the fact, rather than intercepting suspects during the act or shortly afterwards.

Currently, law enforcement officers are limited in the amount of real-time information they can access during the commission of a crime. For example, during a bank robbery, authorities might be alerted to the crime by activation of an alarm. Officers might also receive a description of the suspects from eye witnesses after the crime or even during (e.g., eye witness giving description over a telephone). However, eye witness descriptions are notoriously unreliable because most civilians are not trained observers. Currently, video surveillance data is not broadcast directly to law enforcement authorities.

By relying on the above methods, law enforcement authorities do not have access to reliable images or descriptions during the commission of the crime, thereby impairing their ability to identify and intercept suspects.

Therefore, it would be desirable to have a method for identifying criminal suspects by means of video surveillance and broadcasting this identification information to law enforcement authorities in real time.

SUMMARY OF THE INVENTION

The present invention provides a method, program and apparatus for criminal suspect identification. The invention comprises monitoring and recording video information at a location, and responsive to an event trigger analyzing the video in real time for identifying physical characteristics of any persons in the video. The invention compiles an identification profile for each person in the video, wherein the identification profile includes distinguishing physical characteristics extracted from the video information. The identification profiles are then transmitted to law enforcement authorities. The invention further comprises scanning previously stored video information of the location and comparing, by means of image recognition, physical characteristics in the identification profiles with images in the stored video. The invention determines any matches between identification profiles and images in the stored video, updates the identification profiles with additional information from matched images and transmits the updated identification profile to the authorities.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 depicts a flowchart illustrating an overview of the process of surveillance data matching for suspect identification in accordance with the present invention;

FIG. 4 depicts a flowchart illustrating the process of identifying and evaluating suspects in accordance with the prior art;

FIG. 5 depicts a flowchart illustrating the process of broadcasting preliminary suspect identification in accordance with the present invention; and FIG. 6 depicts a flowchart illustrating the process of matching crime scene images with stored images in accordance with the present invention.

DETAILED DESCRIPTION OF THE PREFERRED EMBODIMENT

Criminals often make a survey of a premise (either personally of through a proxy) prior to executing a crime. This survey is usually within a reasonable time prior to the act, to ensure that significant changes to the scene do not occur before the act, which would reduce the criminal's chances of success.

The present invention provides a method for suspect identification by utilizing previous surveillance data obtained from preliminary casing by the criminal. After the perpetration of a crime, if the scene is subject to recorded surveillance, an investigator can run a comparison scan of the archived surveillance media for matching clothing, body type, facial features (if visible), and other characteristics. The rapid development of more complete information about the suspect can speed up identification before the suspect has traveled beyond a reasonable security cordon.

Figure 1:
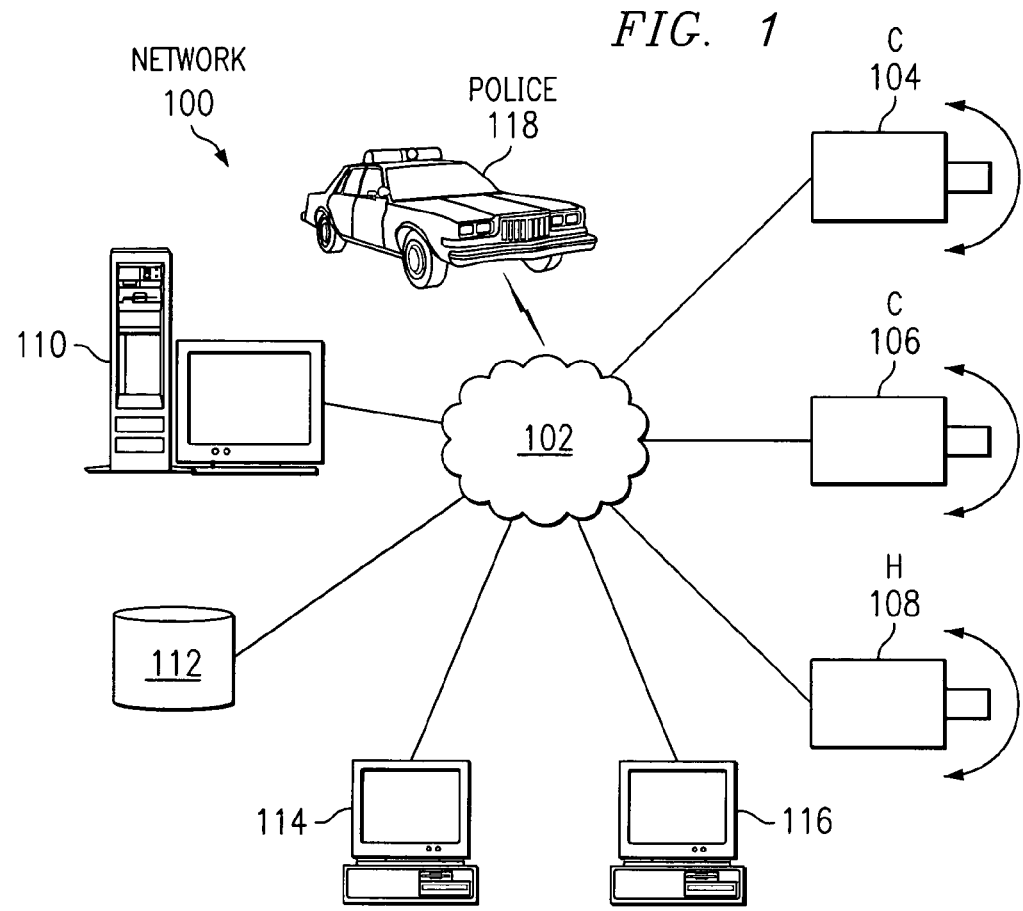
FIG. 1 depicts a pictorial representation of a video surveillance network in which the present invention may be implemented.

With reference now to the figures, FIG. 1 depicts a pictorial representation of a video surveillance network in which the present invention may be implemented. Surveillance system 100 contains a network 102, which is the medium used to provide communications links between various devices and computers connected together within the system. Network 102 may include connections, such as wire, wireless communication links, or fiber optic cables.

In the depicted example, video cameras 104, 106 and 108 are connected to network 102, as are a server 110 and storage unit 112. In addition, clients 114 and 116 are connected to network 102. Clients 114 and 116 may be local monitoring stations or police terminals.

In the present example, video cameras 104 and 106 are ceiling mounted, while camera 108 is hidden. Other mounting configurations are also possible. The cameras 104–108 in surveillance system 100 operate in the visual range of the electromagnetic spectrum but may also include other ranges including infrared (IR) and ultraviolet (UV). In addition, cameras 104–108 may also have light amplification capabilities for low light conditions (night vision).

Cameras 104–108, and clients 114 and 116 are clients of server 110. Storage unit 112 contains a database of images recorded by cameras 104–108, which can be accessed by server 110 to cross reference and compare images recorded by different cameras and at different times.

In addition to communicating with fixed monitoring stations, such as clients 114 and 116, surveillance system 100 may also communication directly with mobile law enforcement officers 118, using real time or recent images, thus allowing quicker and more efficient pursuit of criminal suspects.

Surveillance system 100 may include additional detection means, servers, clients, and other devices not shown.

Surveillance network 102 may be implemented as a number of different types of networks, such as for example, an intranet, a local area network (LAN), or a wide area network (WAN). The network 102 may also comprise secure connections of the Internet. FIG. 1 is intended as an example, and not as an architectural limitation for the present invention.

Biometrics refers to automatic identification of a person based on unique physiological and/or behavioral characteristics. Example characteristics include, height, weight, fingerprints, retina patterns, skin and hair color, and voice patterns. Biometrics systems are essentially pattern recognition systems. One of the most important biometric techniques for video surveillance is image and face recognition.

Figure 2:
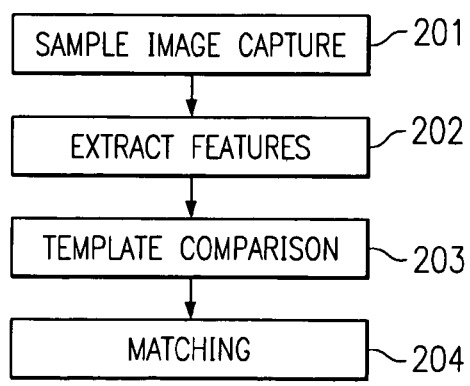
FIG. 2 a flowchart illustrating the process of face recognition in accordance with the present invention.

Referring to FIG. 2, a flowchart illustrating the process of face recognition is depicted in accordance with the present invention. The process begins by sampling captured images (step 201). This comprises taking several pictures of a person's face. In the case of video recording, this might involve sampling images at timed intervals. Ideally, the sampled series of images will incorporate slightly different angles and facial expressions to allow for more accurate searches. After sampling, distinctive features are extracted (step 202). This results in the creation of a template, which is much smaller than the image from which it is drawn. Typically, the template is 1/100th the size of the original image.

After the template is generated, it is compared to templates in a database (step 203). If the degree of similarity reaches a defined threshold (corresponding to statistical correlation models), the system confirms a match between the "live" template and a stored template (step 204).

Face recognition is possible from relatively far distances, unlike some other types of biometric techniques, e.g., fingerprint and retina pattern. In addition, face recognition may be combined with other image identification methods, such as height and weight estimation based on comparison to known reference objects within the visual field.

In addition to biometric identification methods, suspect identification may also include accessory identification such as vehicle recognition, and license plate identification. Vehicle identification would employ image recognition technology similar to face recognition but obviously based on different feature extraction parameters.

Identification of license plates or other distinguishing markings (e.g., bumper stickers or name tags) can be accomplished via Optical Character Recognition (OCR). OCR is machine recognition of printed characters and is well known in the art. When text is entered into the computer, it is turned into a bit map. OCR software analyzes the light and dark areas of the bit map in order to identify each alphabetic letter and numeric digit. When it recognizes a character, it converts it into ASCII text.

Referring to FIG. 3, a flowchart illustrating an overview of the process of surveillance data matching for suspect identification is depicted in accordance with the present invention. The process is initiated by an event trigger (step 301). This trigger might comprise, e.g., a tripped alarm or a manual start of the matching process by security personnel monitoring the premises in question.

When the process is triggered, the surveillance system identifies and evaluates the suspect(s) using visual surveillance data (step 302). The system uses image scanning technology to map the image of the suspect to determine key characteristics of that person.

The system may then broadcast preliminary information to law enforcement authorities (step 303). The system broadcasts the best video available of all suspects to the lowest response level possible. For example, responding officers are the most likely recipients of this transmission, which might include still images if possible. Another possible recipient of the images is the dispatcher, who can relay professional descriptions for the responding officers, rather than relying on civilian eye witnesses (who are not usually good observers).

After the preliminary broadcast of surveillance data, the system regresses through stored images for matches (step 304). This visual information may be current images from other cameras in the system, or archived data. As stated above, criminals often make surveys of a location before committing a crime. Therefore, the surveillance system may already contain visual data of the suspect in question. For example, these cross referenced images may be used to match persons to vehicles or associates and may have been recorded in the previous few minutes, hours, days, or even months.

If there are any matches after comparing the preliminary crime scene images with the other stored images, the new information is appended to the preliminary data (step 306).

The system next determines if there is a change in location or number of suspects (step 307). For example, new suspects might enter the crime scene and leave in a different direction. If there are changes in the location or number of suspects, this new visual data is also analyzed via image scanning (return to step 302).

If there is no change in number or location, the system proceeds to update the broadcast by including the new data appended in step 306 (step 308). The event data and correlation data are then stored (step 309).

Referring now to FIG. 4, a flowchart illustrating the process of identifying and evaluating suspects is depicted in accordance with the prior art. FIG. 4 illustrates in greater detail the process that occurs in step 302 of FIG. 3.

The first step in identifying suspects on video is to "tag" every person visible in the video sources and to set a temporary designation for each person (step 401). In addition, the system can tag specific individuals in the video (i.e., a user can move a cursor to an image and tag it as a suspect).

Next the system attempts to exclude known persons from unknown ones (step 402). For example, employees who are expected to be in the location may be presumed innocent and excluded from further analysis. Known persons may be identified by means of image recognition described above and matched with stored characteristic profiles (i.e. employee database).

Examples of characteristics that can be identified and evaluated include: facial features, skin, hair and eye color, scars, tattoos, jewelry and other accessories, and estimated height and weight. Based on the image analysis, the system can automatically separate strangers from known persons.

Unknown persons who cannot be matched to stored profiles of know persons are added to a list of unknown persons (step 403). In addition, if security personnel are monitoring the video and identify a known person (employee) as one of the perpetrators, they may override the automatic exclusion of known persons and tag that particular known person as a suspect.

Suspect identification profiles in this list will include the characteristics analyzed in step 402. Additional identifying characteristic may also be added to the suspect identification such as, e.g., color of clothing and associated vehicles (license number, color, make, distinctive marks, etc.).

In addition to identifying physical characteristics of suspects, the system can also use image recognition technology to identify handheld objects (e.g., bags, radios, etc.) and weapons the suspect(s) might be carrying (step 404). Image recognition technology can match distinguishing characteristics of handheld objects against profiles to find a possible match. Since an object of the present invention is to reduce the time needed for law enforcement officers to intercept suspects, altering those officers to the presence of weapons is of obvious importance.

Finally, a list of preliminary suspects is created for broadcast (step 405). The package of information for suspects might comprise a description of identifying physical characteristics, the best captured images, estimates of direction of travel, current location and time, and identified weapons. The specific information included in the broadcast and the format of that information will depend on the recipient of that broadcast, as explained below.

Referring now to FIG. 5, a flowchart illustrating the process of broadcasting preliminary suspect identification is depicted in accordance with the present invention. FIG. 5 illustrates in greater detail the process that occurs in step 303 in FIG. 3.

Before the system broadcasts suspect identification information, it first determines who the recipient of the information is and what formats the recipient may use. The system first determines if the recipient is an arriving agent or a relay (dispatcher) for other actors (step 501). If the recipient is an actor arriving to the location of the crime, the system may add Global Positioning System (GPS) data in order to vector the arriving actor to the suspects, based on estimated direction of travel for the suspects and time lapse since the incident (step 502). If the recipient is not arriving at the scene, the system simply proceeds to the next step.

The system then determines if the recipient can accept live video (step 503). If so, the system formats video with identifying marks superimposed on both suspects and known persons (step 504). Many responding vehicles may not have the ability to accept video links, but dispatchers are more likely to have such capabilities. However, the cost and size of in-vehicle video units is always dropping and may become more common in the near future.

The system next determines if the recipient can accept photos (step 505). If so, static images with superimposed identifications similar to the video are formatted and sent to the recipient (step 506). It should be pointed out that the steps of sending video and static images are not mutually exclusive. Even if the recipient is capable of viewing video feeds, the recipient may still be sent static images, which might be easier to study closely for specific features.

Finally, the system determines if the recipient can accept text messages (step 507). If yes, the system renders a text message (step 508). Again, text descriptions are not exclusive of video or still images. In fact, text descriptions may include feature that responding officers or dispatchers might overlook in an image. Therefore, some recipient might receive all three formats of information.

Once the recipient's capabilities have been established, the system broadcasts the suspect identification information in the appropriate format(s) (step 509).

Referring to FIG. 6, a flowchart illustrating the process of matching crime scene images with stored images is depicted in accordance with the present invention. FIG. 6 illustrates in greater detail the process that occurs in step 304 of FIG. 3. Once preliminary identification information is sent to responding authorities, the system regresses through historical video records for additional information about possible suspects.

The system scans stored historical video for possible matches and compares physical characteristics between the preliminary suspects and persons in the stored video record (step 601). The stored video comprises historical day-to-day video surveillance and may cover several days or as long as several months, as indicated above.

During the preliminary analysis of video, known persons are excluded from initial consideration so that limited time and resources may be devoted to identifying unknown persons, assuming there has not been a previous manual override of that exclusion. However, there is always the possibility that known persons (employees or former employees) are involved. Therefore, on the regression through stored images both known and unknown persons in the crime scene video are analyzed.

As described above, image recognition technology can extract particular features which have the greatest individual variance, thus reducing the amount of data from an image that must be analyzed. Such extraction techniques are well known in the art. Physical dimensions (height and weight) may also be estimated and compared with stored images.

In addition to structural features, the system may also analyze behavioral actions and movement patterns (step 602). This is especially important if the suspects are wearing masks, e.g., as in the case of a bank robbery. In the case of a masked criminal, unique movement patterns may be enough to establish match with a person recorded earlier. In such a case, the image of that person's face may be superimposed over the mask in crime scene images, or the older image might be substitutes instead.

The system performs a regression analysis on the above data to calculate the probability of a match (step 603) and then determines if that probability reaches a specified threshold, e.g., 90% (step 604). If the probability does not reach the defined threshold, no match if confirmed and the process ends without new data being appended to the preliminary identification.

If the probability threshold is reached, a match is confirmed and the preliminary identification is updated (step 605). Additional information may include more detailed description or better (previous) images, skin tone, eye color, etc., and if the suspect is identified as an employee or former employee, personal data from the employee database may be appended as well (home address, relatives' addresses, etc.).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for criminal suspect identification, the method comprising the computer implemented steps of:

monitoring and recording video at a location;

responsive to a criminal event at the location, in real time, tagging every person visible in the video to form a set of tagged persons;

comparing the set of tagged persons to stored profiles of known persons;

responsive to comparing the set of tagged persons to the stored profiles of known persons, excluding known persons from unknown persons in the set of tagged persons using the comparison to create a list of unknown persons;

identifying hand held objects possessed by unknown persons in the list of unknown persons to generate an identification of hand held objects;

generating a list of suspects from the list of unknown persons and the identification of hand held objects;

responsive to generating the list of suspects, determining whether a recipient of preliminary information for the criminal event is an agent arriving on the location;

responsive to the recipient being an arriving agent adding global positioning system data to the list of suspects;

responsive to generating the list of suspects, determining whether the recipient is receiving live video, responsive to the recipient is equipped to receive live video, formatting the live video to include identifying marks superimposed on both suspects in the list of suspects and known persons for use in the preliminary information;

responsive to generating the list of suspects, determining whether the recipient is receiving static images;

responsive to a determination that the recipient is equipped to receive static images, formatting the static images to include the identifying marks superimposed on both suspects in the list of suspects and known persons for use in the preliminary information;

after generating the list of suspects, determining whether the recipient is equipped to receive text messages;

responsive to a determination that the recipient is equipped to receive text messages, formatting a text message for use in the preliminary information;

broadcasting the preliminary information an suspects and known persons to the recipient in all appropriate formats to form a preliminary broadcast;

responsive to the preliminary broadcast, scanning stored historical video for possible matches through comparing physical characteristics between suspects in the list of suspects and persons in the stored historical video to form a comparison;

analyzing behavioral actions of the suspects in the video and persons in the historical video to form an analysis;

calculating a probability of a match, through regression analysis, using the analysis and the comparison;

determining whether the probability of the match exceeds a threshold;

confirming the match if the probability of the match exceeds the threshold;

appending the match to the preliminary information;

responsive to appending the match to the preliminary information, determining whether a change in a number of suspects or a change in a location of suspects has occurred;

responsive to an occurrence of the change in the number of suspects or the change in the location of the suspects, analyzing new visual data containing the change in the number of suspects or the change in the location of the suspects;

broadcasting updated information to the recipient, in which the updated information includes appended matches with the preliminary information; and responsive to broadcasting the updated information, storing the updated information.

* * * * *